UNITED STATES PATENT OFFICE.

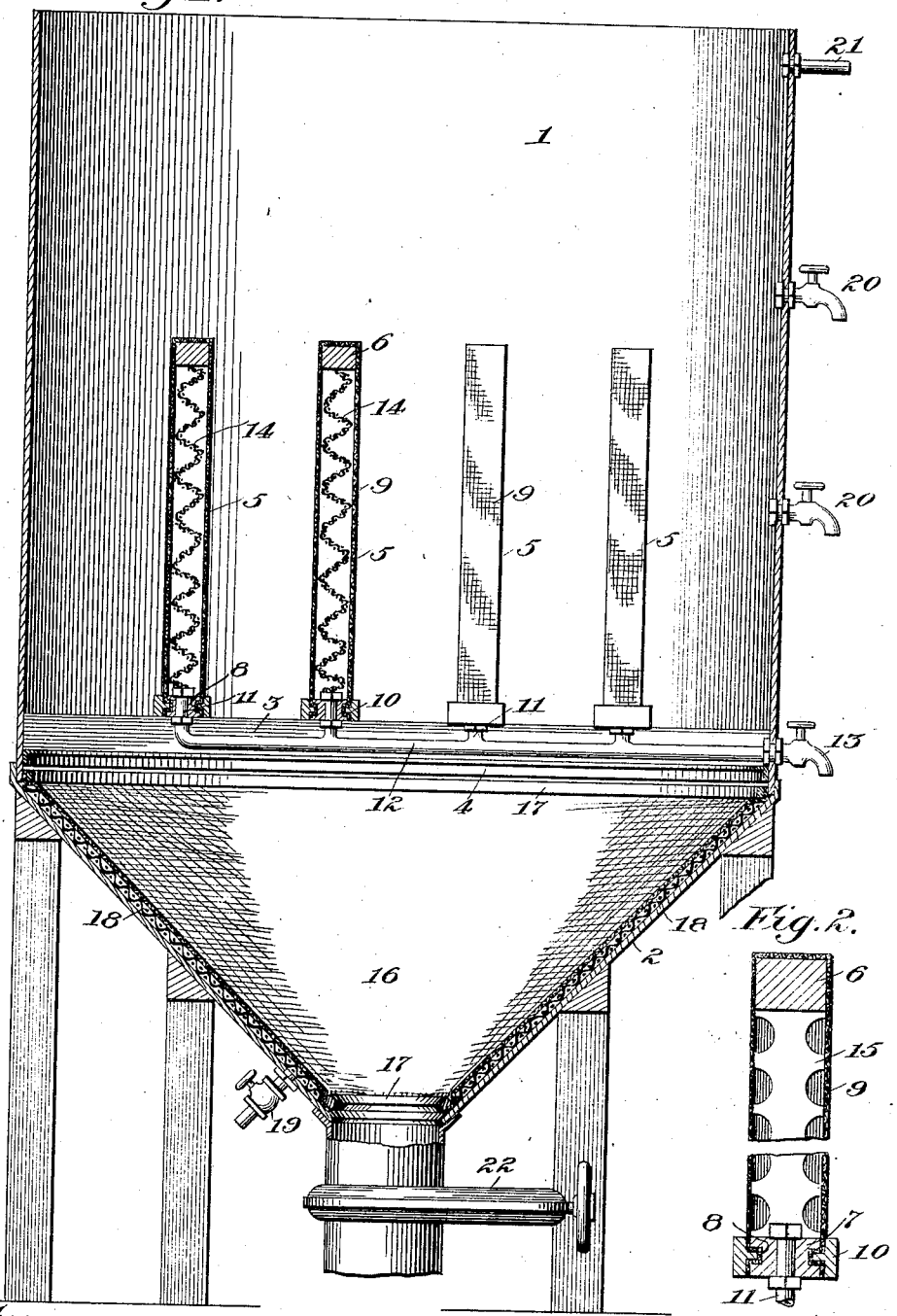

WILBUR ALSON HENDRYX, OF DENVER, COLORADO.

FILTERING AND DECANTING APPARATUS.

No. 889,131.              Specification of Letters Patent.          Patented May 26, 1908.

Original application filed August 9, 1906, Serial No. 329,811. Divided and this application filed March 18, 1907. Serial No. 363,073.

*To all whom it may concern:*

Be it known that I, WILBUR ALSON HENDRYX, a citizen of the United States, residing at Hotel Metropole, in the city of Denver, in the county of Denver and State of Colorado, have invented new and useful Improvements in Filtering and Decanting Apparatus, of which the following is a specification.

The object of this invention is to provide an apparatus for the treatment of mixtures of ore and solvent liquor, such as ore pulp, for the separation therefrom of a clear metal-bearing solution in an expeditious manner.

In its preferred form the apparatus comprises a tank provided with one or more filtering devices, and also with means independent of the filtering devices for decanting or withdrawing clear solution.

The apparatus is adapted for the treatment of a variety of materials and is capable of use in several ways in accordance with the character of the particular material under treatment, as hereinafter more fully described.

For a full understanding of my invention reference is made to the accompanying drawing wherein:

Figure 1 is a central vertical section of one form of apparatus, and Fig. 2 is a central vertical section, on a somewhat enlarged scale, of a modified form of filter.

Referring to the figures, 1 represents a tank which may be of any suitable shape or dimensions, having a converging bottom 2, illustrated as conical. Within the tank and preferably just above the bottom 2 are arranged transverse timbers 3, carried by an angle iron 4 or otherwise held, and serving to support a plurality of filters or filter cells 5 shown as four in number. In the form shown in Fig. 1 each of these cells comprises a rectangular framework 6, conveniently of wood, the bottom member 7 being provided with longitudinal recesses 8. Filter bags 9, of canvas or other material, are drawn over the frame 6 and their lower open ends secured by cleats 10 engaging the recesses 8 above mentioned. Each filter-cell has a bottom discharge 11, the several cells being shown as connected to a common main 12 extending through the tank wall and terminating in a cock 13.

In order to keep the walls of the cells distended under the weight of the material in the tank I prefer to provide in each cell a pervious material capable of preventing the collapse or serious displacement of the filtering walls, while at the same time affording a free passage for the filtered solution. One filling material which I have found suitable for this purpose is cocoa matting, which may be flexed as shown at 14 in Fig. 1 to form a filling, or which may be otherwise disposed. As a modified means for supporting the filter walls I have shown in Fig. 2 a spacing strip 15, conveniently of wood, of which any required number may be used, the several strips being cut away at the sides as shown to provide the maximum practicable filtering area. Or the cells may be filled or packed with strips, blocks or pieces of wood or other material which may be of irregular shape and of ununiform size, the essential feature being the provision of a filling which shall be capable of supporting the walls or preventing substantial displacement thereof while providing a free passageway for the filtered liquid.

16 represents a filtering layer, preferably of canvas, disposed over the conical bottom 2 of the tank and shown as secured by upper and lower cleats or strips 17. Beneath this layer of canvas 16, I have shown a spacing layer or filling 18, which may also consist of cocoa matting. A valved pipe 19 communicates with the space beneath the filter 16. The tank 1 is also provided with one or more cocks 20, disposed at various levels and serving to draw off clear but unfiltered solution as hereinafter described; and an outflow pipe 21 near the top. A sludge gate 22 permits the quick discharge of the contents of the tank.

The mode of operation of the apparatus will depend upon the character of the material treated, and more particularly upon the comparative readiness with which the material may be filtered or settled. A pulp carrying a certain quantity of liquid is run into the tank, and the valves 13 and 19 are opened, permitting the outflow of the clear solution which has passed through the filters 9 and 16. When the pulp is of such nature that it settles leaving a substantially clear liquor, one or more of the decanting cocks 20 is opened and such clear solution withdrawn. After the greater portion of the solution has been separated by filtration or decantation or both, wash water or barren solution is forced through one or both of the openings 13 and 19 and in reverse direction through the filters, and is subsequently recovered as above. After the recovery of the values is substantially complete the residual pulp is sluiced out through 22.

Another mode of operation which is often applicable consists in passing the wash water, barren solution or other leaching agent through pipe 19, thence through the filter 16 and upwardly through the ore pulp, and to permit it to be decanted or to overflow at 21. After the metal-bearing solution has been displaced, the introduction of water or solution at 19 is discontinued, and the solution in the tank is permitted to flow out through the several filters, any clear portions being preferably decanted as above described. After being fully washed the pulp is discharged at 22 as before, and the tank is then ready for recharging. It will be understood that in operating in this manner the filter 16 serves as a very effective distributer for the inflowing liquid, while the filter cells 5 serve to distribute the outflowing liquid. By this even distribution of both inflowing and outflowing liquid any tendency to the production of channels in the body of ore or ore pulp is avoided, and the leaching of the ore or the displacement of the metal-bearing solution is rendered more rapid as well as more effective.

While I have described the filters as operating by gravity, it will be understood that suction may be applied to either or both of the outlets 13, 19, should this be desirable.

While the apparatus is especially designed for the treatment of ore pulp, it is useful for the filtration and decantation of various liquids from pulp or solids.

The filter cell described herein is claimed in my copending application Serial No. 329,811, filed August 9, 1906, of which the present application is a division.

I claim:

1. Apparatus for treating ores comprising a tank having a bottom discharge for ore-pulp, a filter disposed above the bottom of the tank and providing a closed space surrounding said discharge, a pipe communicating with said space, a filter cell in said tank, and an independent outlet for said filter cell.

2. Apparatus for treating ores comprising a tank having a converging bottom and a central discharge for ore-pulp, a filter disposed above the bottom of the tank and providing a closed space surrounding said discharge, a pipe communicating with said space, a filter cell in said tank, and an independent outlet for said filter cell.

3. Apparatus for treating ores comprising a tank having a bottom discharge for ore-pulp, a filter disposed above the bottom of the tank and providing a closed space surrounding said discharge, a pipe communicating with said space, a filter cell in said tank, an independent outlet for said filter cell, and an auxiliary solution outlet in the upper portion of said tank.

4. Apparatus for treating ores comprising a tank having a bottom discharge for ore-pulp, a filter disposed above the bottom of the tank and providing a closed space surrounding said discharge, a pipe communicating with said space, a filter cell in said tank, an independent outlet for said filter cell, and a plurality of auxiliary outlets disposed at different levels in the upper portion of said tank.

5. Apparatus for treating ores comprising a tank having a bottom discharge for ore-pulp, a filter disposed above the bottom of the tank and providing a closed space surrounding said discharge, a pipe communicating with said space, a plurality of filter cells in said tank, and independent outlets for said filter cells.

In testimony whereof I affix my signature in presence of two witnesses.

WILBUR ALSON HENDRYX.

Witnesses:
THEODORA WELLS,
CHAS. R. DAVIES.